Feb. 21, 1961  H. C. WOLLUM  2,972,204
ICE FISHING ROD FOR ARTIFICIAL LURES
Filed Feb. 27, 1959

INVENTOR.
HOGEN C. WOLLUM
BY

United States Patent Office 2,972,204
Patented Feb. 21, 1961

2,972,204
ICE FISHING ROD FOR ARTIFICIAL LURES
Hogen C. Wollum, Norway, Mich. (Vulcan, Mich.)
Filed Feb. 27, 1959, Ser. No. 795,980
5 Claims. (Cl. 43—19.2)

This invention relates to fishing apparatus and more particularly to a rod for fishing through ice holes.

It is an object of the present invention to provide an ice fishing rod that can be conveniently used to move an artificial lure along a circular path beneath the ice from above the ice in a simple and efficient manner.

Another object of the present invention is to provide an ice fishing rod of the above type having a stationary support stand upon which the fishing rod may be rotatably supported in a substantially vertical position so as to rotate the lure about a circular path lying in a substantially horizontal plane beneath the ice.

Other objects of the invention are to provide an ice fishing rod for artificial lures bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which.

Figure 1:
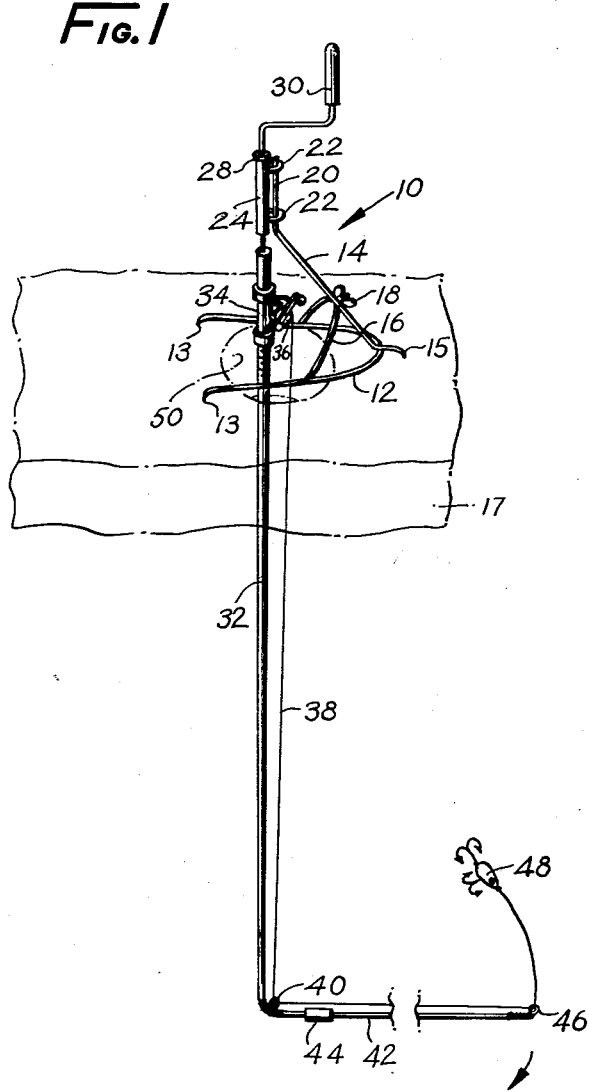
Figure 1 is a perspective view of an ice fishing tackle assembly made in accordance with the present invention in operative use.

Referring now more in detail to the drawing, an ice fishing tackle assembly 10 made in accordance with the present invention is shown to include a stand having a substantially U-shaped base 12 and an upwardly inclined upright 14 connected to a brace 16 by means of a wing nut 18. The lower end of the upright 14 and the free ends of the base 12 are provided with claws 15, 13, which serve to secure the assembly in place upon the ice 17. The uppermost end of the upright 14 is provided with a vertical portion 20 that is rotatably received within a pair of longitudinally spaced apart loops 22 integral with a bearing sleeve 24. This bearing sleeve 24 rotatably receives the shaft 26 of an offset handle 30 longitudinally therethrough with an integral collar 28 limiting downward movement of the handle shaft 26 relative to the bearing sleeve 24 and stand.

Figure 2:
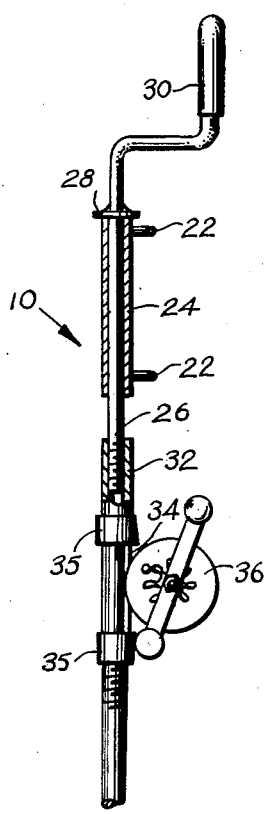
Figure 2 is an enlarged fragmentary side elevational view, partly in section, of certain parts of the assembly shown in Figure 1.
Figure 3:
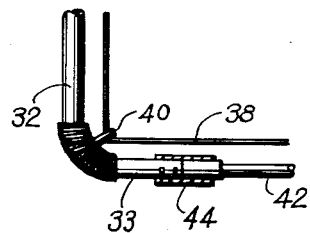
Figure 3 is an enlarged fragmentary side elevational view, partly in section, of the lower part of the unit shown in Figure 1.

As is more clearly shown in Figure 2 of the drawing, the outermost threaded end of the shaft 26 is threadedly received within an internally threaded bore in one end of the main fishing rod section 32 which has a substantially perpendicularly related terminal portion 33 at the opposite end. Securement rings 35 detachably secure the mounting plate 34 of a reel 36 upon the main section 32 adjacent to the handle shaft 26. This reel 36 supports a fishing line 38 that extends downwardly toward the opposite end of the main section 32 and through a ferrule 40 which directs the line in a direction substantially perpendicular to the longitudinal axis of the main section 32.

An auxiliary rod section 42 is detachably mounted upon the free end of the perpendicularly related terminal portion 33 of the main rod section 32, by means of a sleeve 44. The outer free end of the auxiliary rod section 42 includes another ferrule 46 which cooperates with the first mentioned ferrule 40 to guide the line 38 into the water with the fishing lure 48 secured at the free end thereof.

The operation of this device will now be readily understood. The stand is readily assembled by securing the upright 44 to the brace 16 and base 12 by means of the wing nut 18. The auxiliary section 42 of the rod is secured to the terminal portion 33 by means of the sleeve 44, and the reel 36 attached to the main rod section in a well known manner. The shaft 26 of the handle 30 is then placed within the sleeve 24 and secured to the main rod section 32 by means of the threaded engagement hereinbefore referred to. The auxiliary rod section 42 and main rod section 32 are then placed through the opening 50 of the ice 17 and the sleeve 24 is supported by engaging the ice 22 upon the terminal portion 20 of the upright 14. By then rotating the handle 30, the rod section 32 may be made to rotate about its longitudinal axis, thus sweeping the fishing lure 48 through the water beneath the ice in a substantially horizontal plane. Of course, the diameter of the circular path which the lure 48 follows depends upon the length of the auxiliary rod section 42. Because of the detachable features of the present invention, this device may be readily asssembled and disassembled in a convenient manner for easy handling and storage purposes.

While various changes may be made in the detail construction, it shall be understood that such changes shall be within the spirit and scope of the present invention as defined by the appended claims.

What I claim as new and desire to protect by Letters Patent of the United States is:

1. A rod for fishing through ice holes comprising, in combination, a stand for stationarily engaging the ice surface in substantially encircling relation to a hole, a bearing sleeve releasably carried by said stand, a handle rotatably carried by said sleeve, a main rod section secured at one end to said handle, said stand retaining the main rod in an ice hole, an auxiliary rod section detachably carried at one end by the opposite end of said main rod section, a reel with fishing line carried by said one end of said main rod section below the bearing sleeve, and guide means directing said line from said reel to the opposite end of said auxiliary rod section.

2. The combination according to claim 1, wherein said main rod section comprises a substantially straight rod having threaded means at one end for releasable engagement with said handle, and a perpendicularly related terminal portion at the opposite end for connection to said auxiliary rod section.

3. The combination according to claim 2, wherein said auxiliary rod section comprises a substantially straight rod, and a sleeve detachably connecting one end of said straight auxiliary rod to said perpendicularly related terminal portion of said main rod section.

4. The combination according to claim 3, wherein said stand comprises a substantially U-shaped base, a brace connected to and defining an acute angle with said base, and an upright post connected to said brace, one lower end of said upright post and each free end of said U-shaped base defining ice engaging prongs for positioning said stand upon the surface of a sheet of ice in substantially encircling relation to the hole.

5. The combination according to claim 4, wherein said bearing sleeve comprises an elongated tubular member, and a pair of longitudinally spaced apart and perpendicularly outwardly extending eyes slidably receiving the upper free end of said stand upright therethrough, and said tubular member rotatably supporting said handle therewithin and said handle including a collar rotatably engaging the upper end of the sleeve.

References Cited in the file of this patent

UNITED STATES PATENTS

| | | |
|---|---|---|
| 2,122,836 | Gegerfeldt | July 5, 1938 |
| 2,698,725 | Triplett | Jan. 4, 1955 |
| 2,714,270 | Premo | Aug. 2, 1955 |
| 2,720,719 | Stancheck et al. | Oct. 18, 1955 |